US012483461B2

(12) United States Patent
Mula

(10) Patent No.: US 12,483,461 B2
(45) Date of Patent: Nov. 25, 2025

(54) REDUCING RETRANSMISSION LATENCY

(71) Applicant: MELLANOX TECHNOLOGIES, LTD., Yokneam (IL)

(72) Inventor: Liron Mula, Hertzliya (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 18/389,550

(22) Filed: Nov. 14, 2023

(65) Prior Publication Data

US 2025/0158873 A1 May 15, 2025

(51) Int. Cl.
*H04L 41/0604* (2022.01)
*H04L 41/0659* (2022.01)

(52) U.S. Cl.
CPC ...... *H04L 41/0627* (2013.01); *H04L 41/0622* (2013.01); *H04L 41/0661* (2023.05)

(58) Field of Classification Search
None
See application file for complete search history.

(56) References Cited

U.S. PATENT DOCUMENTS

| | | | |
|---|---|---|---|
| 2014/0359044 A1* | 12/2014 | Davis | H04L 49/25 709/213 |
| 2015/0223098 A1* | 8/2015 | Sze | H04L 43/0852 370/235 |
| 2016/0234127 A1* | 8/2016 | Agarwal | H04L 47/34 |
| 2018/0034686 A1* | 2/2018 | Vaidyanathan | G06F 11/0793 |
| 2021/0320722 A1* | 10/2021 | Wu | H04B 10/2507 |
| 2022/0369153 A1* | 11/2022 | Manja Ppallan | H04W 28/0289 |

* cited by examiner

*Primary Examiner* — Mohamed Ibrahim
(74) *Attorney, Agent, or Firm* — Sheridan Ross P.C.

(57) ABSTRACT

A device, communication system, and method are provided. In one example, a system for reducing latency in out-of-order data transfers is described that includes circuits to detect a network error; and in response to detecting the network error, transmit a notification to at least one of a plurality of connected nodes that the network error was detected, wherein the notification causes each node that receives the notification to change at least one transport layer parameter.

20 Claims, 4 Drawing Sheets

300

| Version | Priority | Flow Label | | |
|---|---|---|---|---|
| | | Payload Length | Flag 301 | Hop Limit |
| Source Address | | | | |
| Destination Address | | | | |
| Extension headers | | | | |

Fig. 3

REDUCING RETRANSMISSION LATENCY

FIELD OF THE DISCLOSURE

The present disclosure is generally directed to systems, methods, and devices for error checking and, in particular, reducing retransmission latency in out-of-order data transfers.

BACKGROUND

Data may be split into multiple packets that are routed to their destination via multiple paths by hopping from router to router. One node may send multiple messages to another node, which needs to identify which packets belong together. Additionally, packets may arrive out of order. That can happen especially if two packets follow different paths to the destination. Packets can be corrupted, which means that for some reason, the received data no longer matches the originally sent data. Packets may also be lost due to problems in the physical layer or in routers' forwarding tables. If even one packet of a message is lost, it may be impossible to put the message back together in a way that makes sense. Similarly, packets might be duplicated due to accidental retransmission of the same packet. Transmission Control Protocol (TCP) and User Datagram Protocol (UDP) are data transport protocols for packet ordering, retransmission, and data integrity.

BRIEF SUMMARY

Transport-layer protocols (e.g., Transmission Control Protocol (TCP), Remote Direct Memory Access (RDMA), and User Datagram Protocol (UDP)) are data transport protocols for packet ordering, retransmission, and data integrity. Transport-layer protocols guarantee lossless data-transfer from A to B, by retransmitting data that is lost along the path. Some transport-layer protocols support out-of-order data transfer, such that a message transmitted from node A to node B is broken into multiple smaller packets that can be delivered between node A and node B, out of order. In such protocols, the receiver receives packets out of order, re-orders them, and sends an acknowledgement.

When a receiver receives packets out of order, it may be difficult to distinguish between a packet that is delayed by the network, and is soon expected (e.g., a delayed packet); and a packet that was discarded (or otherwise lost) by the network (e.g., lost packet) and will never arrive. Since the receiver is uncertain whether a packet is delayed or lost, the receiver delays its retransmission request in order to prevent transmission of duplicate packets, which in turn causes high latency in event of packet discards. In other words, the uncertainty of whether a packet is delayed or lost causes high "tail latency," which impacts application performance, because an entire application, running on thousands of nodes may be impacted from a single node delaying its retransmission message.

In networks, "physical layer errors" or Physical Coding Sublayer (PCS) block errors (e.g., random errors on an analog medium due to thermal or cosmic noise, or optical analog device failures) cause a majority of packet discards (e.g., up to >99% of the packet discards are of this type). When a packet is discarded due to physical layer errors or physical coding sublayer (PCS) errors, the network equipment can detect that a PCS error had occurred and can signal the sender, the receiver, or both that a packet may have been discarded. In embodiments, the present disclosure may be able to determine the specific sender and/or recipient of the discarded packet. In other embodiments it may not be possible to determine the sender and/or recipient of the discarded packet (e.g., if the packet is corrupted), and all nodes or a subset of all nodes connected to a device are notified regarding the packet discard. For example, all nodes connected to a specific port on a switch may be notified when a packet transmitted via that port is discarded. Nodes that are alerted of the PCS error/packet discard may reduce, for a predetermined amount of time, the time for transmission requests. In other words, the nodes for a predetermined amount of time after the alert may be more sensitive to packet discards and reduce the time it waits to see if a delayed packet is received before sending a retransmission request.

In embodiments, a network device can inform the sender(s) and/or receiver(s) of the potentially discarded packet by sending a packet to the sender(s) and/or receiver(s) with an indication of at least one packet was lost. In other embodiments, a network device can mark, for a predetermined period of time, all the packets flowing through (e.g., on a specific port) with a dedicated flag. For example, there may be a flag added to the packet header that may be turned on or off to indicate a packet (might) have been lost recently. The present disclosure utilizes transport-layer information to reduce retransmission latency in out-of-order data transfers. In other words, the receiver(s) may more intelligently distinguish between a delayed packet and a discarded packet. Additionally, or alternatively, a sender may initiate retransmission without waiting for a retransmission request.

In accordance with one or more embodiments described herein, a network device, such as a switch, may enable a diverse range of nodes, such as switches, servers, personal computers, and other computing devices, to communicate across a network. Ports of the network device may function as communication endpoints, allowing the network device to manage multiple simultaneous network connections with one or more nodes.

Each port of the network device may be considered a lane and may be associated with an egress queue of data, such as in the form of packets, waiting to be sent via the port. In effect, each port may serve as an independent channel for data communication to and from the network device. Each port of the network device may be connected to one or more ports of one or more other devices. Ports allow for concurrent network communications, enabling the network device to engage in multiple data exchanges with different network nodes simultaneously.

Load balancing of network traffic between multiple paths is conventionally a computationally difficult task. Consider a network switch receiving packets from one or more sources. Each packet flowing through the switch is associated with a particular destination. In simple topologies, there may be a single port of the switch which the packet must be sent from to reach the destination. However, in modern network topologies, such as clusters of graphics processing units (GPUs) used for artificial intelligence (AI) related tasks, there may be many possible ports from which a packet may be transmitted to reach an associated destination. As a result, a decision must be made as to which one of many possible ports should transmit each packet due to the existence of multiple paths in the network. A goal of a switch in such a scenario in many applications is to route packets toward a destination in such a way as to provide maximal total throughput and avoiding congestion.

The present disclosure describes a system and method for reducing retransmission latency in out-of-order data transfers. Embodiments of the present disclosure aim to solve the above-noted shortcomings and other issues by implementing an improved approach to detecting discarded packets. Systems and methods as described herein reduce retransmission latency and other issues arising from packet discards.

The approach depicted and described herein may be applied to any suitable type of device known or yet to be developed. In an illustrative example, a method is disclosed that includes detecting a network error, and in response to detecting the network error, transmitting a notification to connected nodes that the network error was detected. The method also includes changing, by each node that receives the notification, at least one transport layer parameter, wherein after a predetermined amount of time the at least one transport layer parameter reverts back to an original value.

In another example, a system is disclosed that includes one or more circuits to detect a network error; and in response to detecting the network error, transmit a notification to at least one of a plurality of connected nodes that the network error was detected, wherein the notification causes each node that receives the notification to change at least one transport layer parameter.

In yet another example, a device is disclosed that includes an interface to detect a network error; and processing circuitry to, in response to detecting the network error, transmit a notification to connected nodes that the network error was detected, wherein the notification causes each node that receives the notification to reduce a latency threshold.

Any of the above example aspects include wherein transmitting the notification comprises transmitting a packet with an indication that the network error was detected.

Any of the above example aspects include wherein the packet with the indication that the network error was detected includes a timestamp.

Any of the above example aspects include wherein transmitting the notification comprises a dedicated flag in subsequent packets being turned on.

Any of the above example aspects include wherein the network error comprises an optical or electrical device error.

Any of the above example aspects include wherein the network error comprises thermal or cosmic noise.

Any of the above example aspects include wherein detecting the network error comprises detecting an egress port associated with the detected network error.

Any of the above example aspects include wherein transmitting the notification comprises a dedicated flag, in subsequent packets transmitted on the egress port associated with the detected network error, being turned on.

Any of the above example aspects include wherein transmitting the notification to the connected nodes that the network error was detected comprises transmitting the notification to nodes connected to the egress port associated with the detected network error.

Any of the above example aspects include wherein changing the at least one transport layer parameter comprises reducing for a predetermined amount of time a timeout for requesting a retransmission.

Any of the above example aspects include wherein the notification comprises a packet with an indication that the network error was detected, and wherein the packet with the indication that the network error was detected includes a timestamp.

Any of the above example aspects include wherein the latency threshold is reduced for a predetermined amount of time and after the predetermined amount of time, the latency threshold reverts back to an original value.

Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale:

FIG. 3 illustrates an example packet header in accordance with at least some embodiments of the present disclosure.

DETAILED DESCRIPTION

Figure 1:
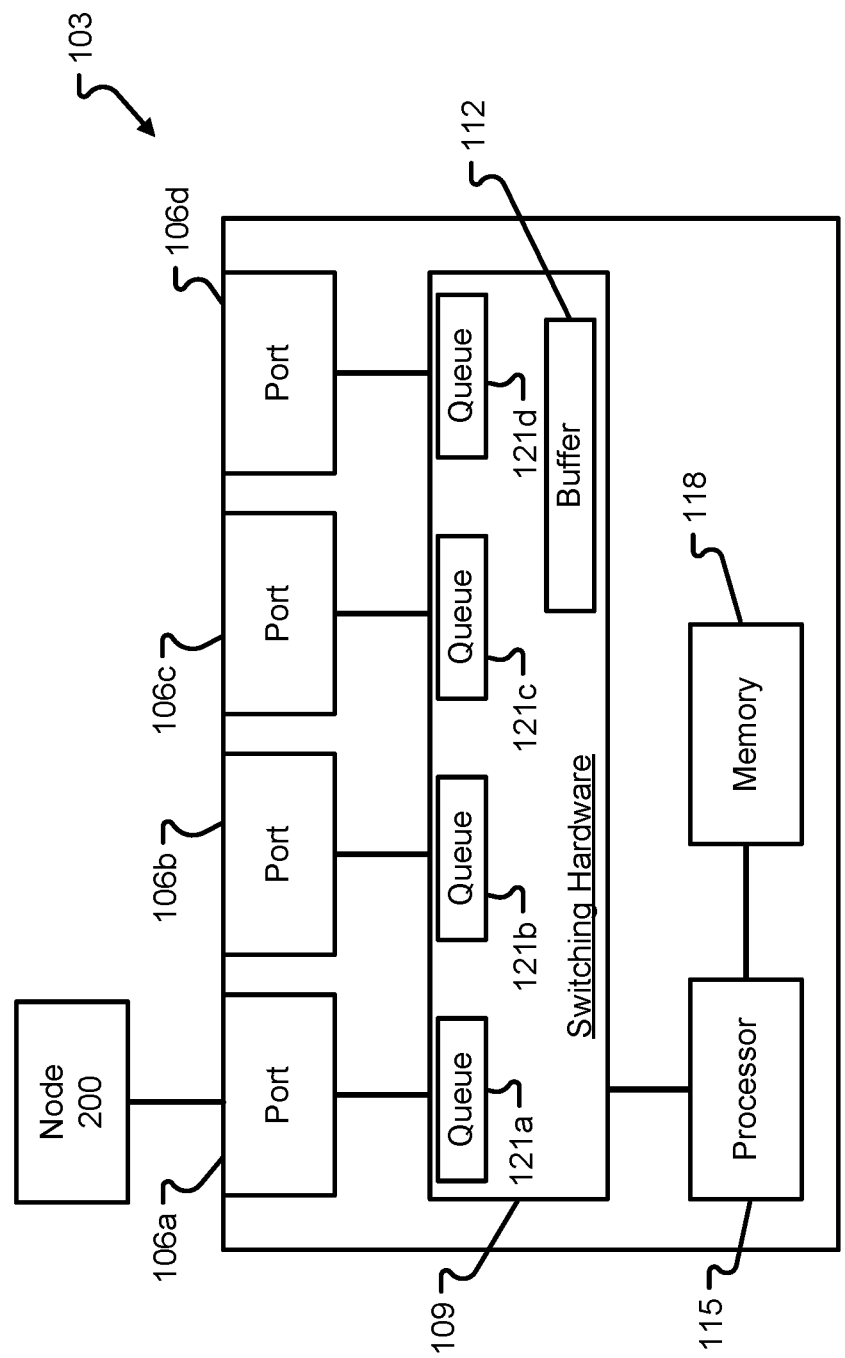
FIG. 1 is a block diagram depicting an illustrative configuration of a computing system in accordance with at least some embodiments of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The details of one or more aspects of the disclosure are set forth in the accompanying drawings and the description below. Other features, objects, and advantages of the techniques described in this disclosure will be apparent from the description and drawings, and from the claims.

The phrases "at least one," "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages are described herein and will be apparent to those skilled in the art upon consideration of the following Detailed Description and in view of the figures.

The ensuing description provides embodiments only, and is not intended to limit the scope, applicability, or configuration of the claims. Rather, the ensuing description will provide those skilled in the art with an enabling description for implementing the described embodiments. It is understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means: A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably, and include any appropriate type of methodology, process, operation, or technique.

Various aspects of the present disclosure will be described herein with reference to drawings that are schematic illustrations of idealized configurations.

Any of the steps, functions, and operations discussed herein can be performed continuously and automatically.

The exemplary systems and methods of this disclosure have been described in relation to a network of switches; however, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-4, various systems, and methods for out-of-order data transfers and retransmission requests between communication nodes will be described. The concepts of packet routing depicted and described herein can be applied to the routing of information from one computing device to another. The term packet as used herein should be construed to mean any suitable discrete amount of digitized information. The information being routed may be in the form of a single packet or multiple packets without departing from the scope of the present disclosure. Furthermore, certain embodiments will be described in connection with a system that is configured to make centralized routing decisions whereas other embodiments will be described in connection with a system that is configured to make distributed and possibly uncoordinated routing decisions. It should be appreciated that the features and functions of a centralized architecture may be applied or used in a distributed architecture or vice versa.

In accordance with one or more embodiments described herein, a computing system 103 as illustrated in FIG. 1 may enable a diverse range of systems, such as switches, servers, personal computers, and other computing devices, to communicate across a network. Such a computing system 103 as described herein may for example be a switch or any computing device comprising a plurality of ports 106*a-d* for connecting with nodes on a network.

The ports 106*a-d* of the computing system 103 may function as communication endpoints, allowing the computing system 103 to manage multiple simultaneous network connections with one or more nodes. Each port 106*a-d* may be used to transmit data associated with one or more flows. Each port 106*a-d* may be associated with a queue 121*a-d* enabling the port 106*a-d* to handle incoming and outgoing data packets associated with flows.

Each port 106*a-d* of the computing system may be considered a lane and be associated with a respective egress queue 121*a-d* of data, such as in the form of packets, waiting to be sent via the port 106*a-d*. In effect, each port 106 may serve as an independent channel for data communication to and from the computing system 103. Ports 106 allow for concurrent network communications, enabling the computing system 103 to engage in multiple data exchanges with different network nodes simultaneously. As a packet or other form of data becomes ready to be sent from the computing system 103, the packet may be assigned to a port 106 from which the packet will be sent by being stored in a queue 121 associated with the port 106.

The ports 106*a-d* of the computing system 103 may be physical connection points which allow network cables such as Ethernet cables to connect the computing system 103 to one or more network nodes. Each port 106*a-d* may be of a different type, including, for example, a 100 Mbps, 1000 Mbps, or 10-Gigabit Ethernet ports, each providing different levels of bandwidth.

Because each port 106*a-d* may be used to send a particular packet, when a packet is received, created, or otherwise handled by the computing system 103 and is to be transmitted from the computing system 103, one or more ports 106*a-d* of a computing system 103 may be selected to transmit the packet. Transmitting a packet from a port 106*a-d* may comprise placing the data in a queue 121*a-d* associated with the other port 106*a-d*.

Switching hardware 109 of the computing system may comprise an internal fabric or pathway within the computing system 103 through which data travels between two ports 106*a-d*. The switching hardware 109 may in some embodiments comprise one or more network interface cards (NICs). For example, in some embodiments, each port 106*a-d* may be associated with a different NIC. The NIC or NICs may comprise hardware and/or circuitry which may be used to transfer data between ports 106*a-d*.

Switching hardware 109 may also or alternatively comprise one or more application-specific integrated circuits (ASICs) to perform tasks such as determining to which port a received packet should be sent. The switching hardware 109 may comprise various components including, for example, port controllers that manage the operation of individual ports, network interface cards that facilitate data transmission, and internal data paths that direct the flow of data within the computing system 103. The switching hardware 109 may also include memory elements to temporarily store data and management software to control the operation of the hardware. This configuration could enable the switching hardware 109 to accurately track port usage and provide data to the processor 115 upon request.

Packets received by the computing system 103 may be placed in a buffer 112 until being placed in a queue 121*a-d* before being transmitted by a respective port 106*a-d*. The buffer 112 may effectively be an ingress queue where received data packets may temporarily be stored. As described herein, the ports 106*a-d* via which a given packet is to be sent may be determined based on a number of factors.

As illustrated in FIG. 1, the computing system 103 may also comprise a processor 115, such as a CPU, a microprocessor, or any circuit or device capable of reading instructions from memory 118 and performing actions. The processor 115 may execute software instructions to control operations of the computing system 103.

The processor 115 may function as the central processing unit of the computing system 103 and execute the system's operative capabilities. Processor 115 communicates with other components of the computing system 103 to manage and perform computational operations, ensuring optimal system functionality and performance.

In further detail, the processor 115 may be engineered to perform a wide range of computational tasks. Its capabilities may encompass executing program instructions, managing data within the system, and controlling the operation of other hardware components such as switching hardware 109. The processor 115 may be a single-core or multi-core processor and might include one or more processing units, depending on the specific design and requirements of the computing system 103. The architectural design of the processor 115 may allow for efficient instruction execution, data processing, and overall system management, thereby enhancing the performance and utility of computing system 103 in various applications. Furthermore, the processor 115 may be programmed or adapted to execute specific tasks and operations according to application requirements, thus potentially enhancing the versatility and adaptability of the computing system 103.

The computing system 103 may further comprise one or more memory 118 components. Memory 118 may be configured to communicate with the processor 115 of the computing system 103. Communication between memory 118 and the processor 115 may enable various operations, including but not limited to, data exchange, command execution, and memory management.

The memory 118 may be constituted by a variety of physical components, depending on the specific type and design. At the core, memory 118 may include one or more memory cells capable of storing data in the form of binary information. These memory cells may be made up of transistors, capacitors, or other suitable electronic components depending on the memory type, such as DRAM, SRAM, or Flash memory. To enable data transfer and communication with other parts of the computing system 103, memory 118 may also include data lines or buses, address lines, and control lines. Such physical components may collectively constitute the memory 118, contributing to its capacity to store and manage data.

Data stored in memory 118 may encompass information about various aspects of port, buffer, and system usage. Such information might include data about active connections, amount of data in queues 121a-d, amount of data in the buffer 112, statuses of each port within the ports 106a-d, among other things. Data may include, for example, buffer-occupancy, a number of active ports 106a-d, a number of total ports 106a-d, and a queue depth or length for each port 106a-d, as described in greater detail herein. The data may be stored, accessed, and utilized by the processor 115 in managing port operations and network communications. For example, the processor 115 might utilize the data in memory 118 to manage network traffic, prioritize, or otherwise control the flow of data through the computing system 103 as described in greater detail herein. Therefore, the memory 118, in potential conjunction with the processor 115, may play a crucial role in optimizing the usage and performance of the ports 106 of the computing system 103.

Data stored in memory 118 may include various metrics such as amount of data or a number of packets in each queue 121a-d, an amount of data or a number of packets in the buffer 112, and/or other information, such as data transmission rates, error rates, and status of each port. The processor 115, after receiving this data, might perform further operations based on the obtained information, such as optimizing port usage, balancing network load, or troubleshooting issues, as described herein.

Figure 2:
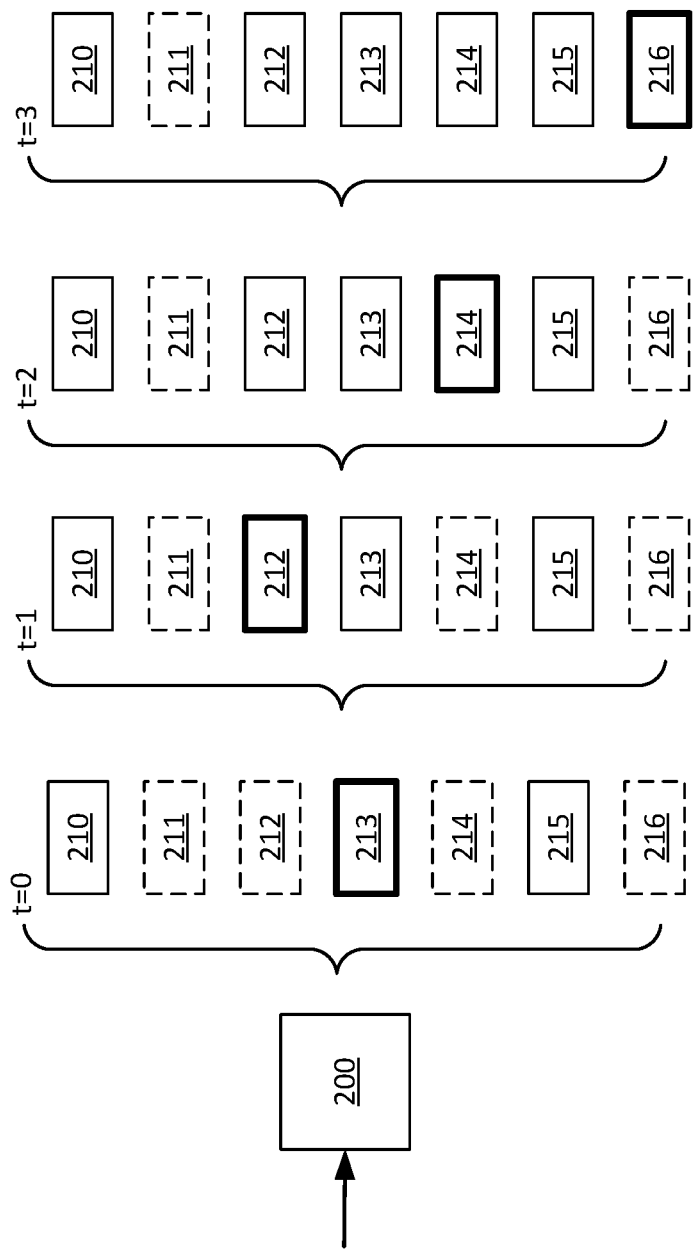
FIG. 2 illustrates a block diagram depicting out-of-order data transfers in accordance with at least some embodiments of the present disclosure.

In one or more embodiments of the present disclosure, a computing system 103, such as a switch, may be in communication with a plurality of network nodes 200 as illustrated in FIG. 2. Each network node 200 may be a computing system with capabilities for sending and receiving data. Each node 200 may be any one of a broad range of devices, including but not limited to switches, personal computers, servers, or any other device capable of transmitting and receiving data in the form of packets.

The computing system 103 may establish communication channels with the network nodes 200 via the ports 106a-f. Such channels may support data transfer in the form of flows of packets, following predetermined protocols that govern the format, size, transmission method, and other aspects of the packets.

Each network node 200 may interact with the computing system 103 in various ways. A node 200 may send data packets to the computing system 103 for processing, transmission, or other operations, or for forwarding to another node 200. Conversely, each node 200 may receive data from the computing system 103, originating from either the computing system 103 itself or other network nodes 200 via the computing system 103. In this way, the computing system 103 and nodes 200 could collectively form a network, facilitating data exchange, resource sharing, and a host of other collaborative operations.

Nodes 200 may be connected to a plurality of computing systems 103 forming a network of nodes 200 and computing systems 103. For example, the systems and methods described herein may comprise a plurality of interconnected switches. Multiple computing systems 103, such as switches, can be interconnected in a variety of topologies, such as star, ring, or mesh, depending upon the specific requirements and resilience needed for the network. For instance, in a star topology, a plurality of switches may be connected to a central switch, whereas in a ring topology, each switch may be connected to two other switches in a closed loop. In a mesh topology, each switch may be interconnected with every other switch in the network.

In the example illustrated in FIG. 2, node 200 receives packets (e.g., packets 210-216). The packets may be received out of order as illustrated. At t=0, node 200 has received packets 210, 213, and 215. As indicated by the bolded line, packet 213 was the most recently received packet. At t=0, the node 200 is still awaiting packets 211, 212, 214, and 216. In some cases, packets 211 and 212 are delayed. However, either of both of packets 211 and 212 may be discarded, and therefore will never be received. In the case of a discarded packet, the node 200 may wait for a predetermined period before requesting retransmission.

At t=1, packet 212 is received. At t=2, packet 214 is received. At t=3, packet 216 is received. At t=3, the node 200 is still awaiting packet 211. In embodiments, if packet 211 was discarded at or before t=0, the receiver may has requested retransmission of packet 211, without waiting until a later time (e.g., t=4).

FIG. 3 illustrates an example packet header 300. The packet header 300 may include a flag 301 that may be turned off/on to indicate to the node 200 (e.g., a receiver) that they should adjust one or more transport layer parameters (e.g., time for retransmission requests). A size of a packet as described herein may be measured in bits or bytes. The size of a packet may depend on, for example, a size of a payload of the packet. For example, packets generated by an application may include various sizes of payloads.

Figure 4:
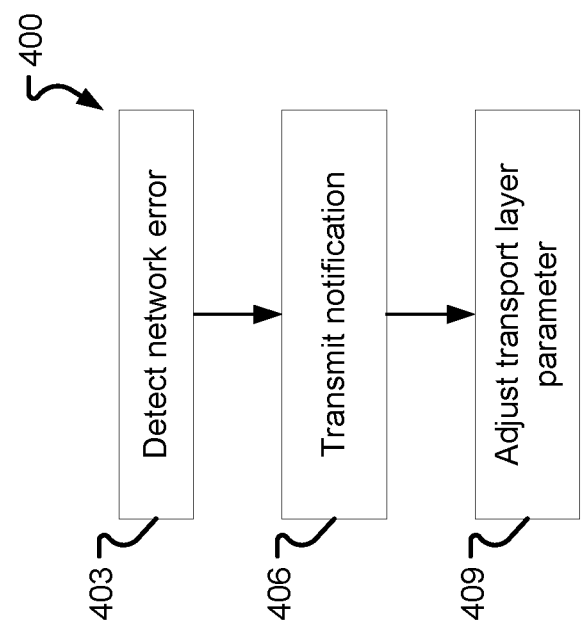
FIG. 4 is a flow diagram depicting a method in accordance with at least some embodiments of the present disclosure.

As illustrated in FIG. 4, and in accordance with a computing system 103 as illustrated in FIG. 1, and as described herein, a method 400 may be performed to reduce retransmission request. While the description of the method 400 provided herein describes steps of the method 400 as being performed by a processor 115 of the computing system 103, the steps of the method 400 may be performed by one or more processors 115, switching hardware 109, one or more controllers, one or more circuits in the computing system 103, packet senders, packet receivers, or some combination thereof. As should be appreciated, the method 400 may be implemented through hardware or software.

At step 403, the method 400 may begin with a processor 115 of a computing system 103 detecting a network error (e.g., a PCS error). When a packet is discarded due to physical layer errors or PCS errors, the network equipment can detect that a PCS error has occurred and can signal the sender, the receiver, or both that a packet may have been discarded. In other examples, the computing system 103 may detect that a packet was discarded.

At step 406, the method 400 may comprise transmitting a notification to relevant nodes. In embodiments, the computing system 103 may be able to determine the specific sender and/or recipient of the discarded packet. In other embodiments it may not be possible to determine the sender and/or recipient of the discarded packet (e.g., if the packet is corrupted), and all nodes or a subset of all nodes connected to a device are notified regarding the packet discard. For example, all nodes connected to a specific port on a switch may be notified when a packet transmitted via that port is discarded.

At step 409, the method 400 comprises alerting the nodes to the PCS error/packet discard. For example, affected nodes are alerted. In an example, if the receiver of the discarded packet can be determined, the receiver is alerted. In another example, nodes connected via a port associated with the error/packet discard are alerted. In yet another example, all nodes connected to a switch may be alerted in the event of an error/packet discard on the switch. In response to the alert (e.g., a flag, packet, etc.), nodes may adjust their transport layer parameters for a predetermined amount of time. For example, affected nodes may reduce, for a period of time, a time for transmission requests. In other words, the nodes for a predetermined amount of time after the alert may be more sensitive to packet discards and may reduce the time a node waits to see if a delayed packet is received before sending a retransmission request.

Embodiments of the present disclosure include a system comprising one or more circuits to: receive a packet; determine a size of the packet; determine a group of a plurality of groups of the packet based on the size of the packet; determine a port for the packet using a round-robin for the group of the packet; and send the packet via the port.

Embodiments also include a system including one or more circuits to: receive a plurality of packet sizes from an application; initialize a plurality of packet arbiter circuits, wherein each packet arbiter circuit is associated with one of the plurality of packet sizes; receive a first packet associated with the application; determine a size of the packet; based on the determined size of the packet, associate the packet with one of the packet arbiter circuits; select, with the associated packet arbiter circuit, a port of a plurality of ports; and route the packet to the selected port of the plurality of ports.

Embodiments also include a switch comprising one or more circuits to: receive a packet; match a size of the packet to a packet size category; based on the packet size category matching the size of the packet, determine a port for the packet using a round-robin associated with the packet size category of the packet; and send the packet via the port.

Aspects of the above systems and switch include wherein the one or more circuits are further to: receive application data from application; and create the plurality of groups based on the application data.

Embodiments of the present disclosure include a method comprising detecting a network error, and in response to detecting the network error, transmitting a notification to connected nodes that the network error was detected. The method also includes changing, by each node that receives the notification, at least one transport layer parameter, wherein after a predetermined amount of time the at least one transport layer parameter reverts back to an original value.

Embodiments of the present disclosure also include a system comprising one or more circuits to detect a network error; and in response to detecting the network error, transmit a notification to at least one of a plurality of connected nodes that the network error was detected, wherein the notification causes each node that receives the notification to change at least one transport layer parameter.

Embodiments of the present disclosure also include a device comprising an interface to detect a network error; and processing circuitry to, in response to detecting the network error, transmit a notification to connected nodes that the network error was detected, wherein the notification causes each node that receives the notification to reduce a latency threshold.

Aspects of the above method, systems, and devices include wherein transmitting the notification comprises transmitting a packet with an indication that the network error was detected.

Aspects of the above method, systems, and devices include wherein the packet with the indication that the network error was detected includes a timestamp.

Aspects of the above method, systems, and devices include wherein transmitting the notification comprises a dedicated flag in subsequent packets being turned on.

Aspects of the above method, systems, and devices include wherein the network error comprises an optical or electrical device error.

Aspects of the above method, systems, and devices include wherein the network error comprises thermal or cosmic noise.

Aspects of the above method, systems, and devices include wherein detecting the network error comprises detecting an egress port associated with the detected network error.

Aspects of the above method, systems, and devices include wherein transmitting the notification comprises a dedicated flag, in subsequent packets transmitted on the egress port associated with the detected network error, being turned on.

Aspects of the above method, systems, and devices include wherein transmitting the notification to the connected nodes that the network error was detected comprises transmitting the notification to nodes connected to the egress port associated with the detected network error.

Aspects of the above method, systems, and devices include wherein changing the at least one transport layer parameter comprises reducing for a predetermined amount of time a timeout for requesting a retransmission.

Aspects of the above method, systems, and devices include wherein the notification comprises a packet with an indication that the network error was detected, and wherein the packet with the indication that the network error was detected includes a timestamp.

Aspects of the above method, systems, and devices include wherein the latency threshold is reduced for a predetermined amount of time and after the predetermined amount of time, the latency threshold reverts back to an original value.

It is to be appreciated that any feature described herein can be claimed in combination with any other feature(s) as described herein, regardless of whether the features come from the same described embodiment.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method for reducing latency in out-of-order data transfers, the method comprising:
   detecting, at a first node that routes data traffic from a sender node to one or more receiver nodes, a network error associated with the data traffic; and
   in response to detecting the network error, transmitting, by the first node, a notification to the one or more receiver nodes that causes the one or more receiver nodes to temporarily reduce an amount of time that is allowed to elapse before requesting the sender node to retransmit one or more packets.

2. The method of claim 1, wherein transmitting the notification comprises transmitting a packet with an indication that the network error was detected.

3. The method of claim 2, wherein the packet with the indication that the network error was detected includes a timestamp.

4. The method of claim 1, wherein detecting the network error comprises identifying an egress port associated with the detected network error.

5. The method of claim 4, wherein transmitting the notification comprises turning on a dedicated flag, in packets transmitted by the egress port.

6. The method of claim 4, wherein the one or more receiver nodes are connected to the egress port.

7. The method of claim 1, wherein transmitting the notification comprises turning on a dedicated flag in transmitted packets.

8. The method of claim 1, wherein the network error comprises an optical or electrical device error.

9. The method of claim 1, wherein the network error comprises thermal or cosmic noise.

10. The method of claim 1, wherein detecting the network error comprises identifying at least one of the sender node or the one or more receiver nodes.

11. A system for reducing latency in out-of-order data transfers, the system comprising one or more circuits to:
    detect a network error associated with data traffic in transit from a sender node to one or more receiver nodes; and
    in response to detecting the network error, transmit a notification to the one or more receiver nodes that causes the one or more receiver nodes to temporarily reduce an amount of time that is allowed to elapse before requesting the sender node to retransmit one or more packets.

12. The system of claim 11, wherein the network error is associated with at least one egress port.

13. The system of claim 12, wherein transmitting the notification comprises turning on a dedicated flag in packets transmitted on from the at least one egress port.

14. The system of claim 11, wherein the notification comprises a packet with an indication that the network error was detected, and wherein the packet with the indication that the network error was detected includes a timestamp.

15. The system of claim 11, wherein transmitting the notification comprises turning on a dedicated flag in transmitted packets.

16. The system of claim 11, wherein the network error comprises at least one of: an optical device error, an electrical device error, and thermal or cosmic noise.

17. The system of claim 11, wherein detecting the network error includes identifying at least one of the sender node or the one or more receiver nodes.

18. A device for reducing latency in out-of-order data transfers, the device comprising:
    an interface to detect a network error associated with data traffic in transit from a sender node to one or more receiver nodes; and
    processing circuitry to, in response to detecting the network error, transmit a notification to the one or more receiver nodes that causes the one or more receiver nodes to temporarily reduce an amount of time that is allowed to elapse before requesting the sender node to retransmit one or more packets.

19. The device of claim 18, wherein the processing circuitry is to:
    identify at least one of the sender node or the one or more receiver nodes.

20. The device of claim 18, wherein transmitting the notification comprises transmitting a packet with an indication that the network error was detected.

* * * * *